US009670344B2

(12) United States Patent
Favis et al.

(10) Patent No.: US 9,670,344 B2
(45) Date of Patent: Jun. 6, 2017

(54) POLYMERIC MATERIAL AND PROCESS FOR RECYCLING PLASTIC BLENDS

(71) Applicant: POLYVALOR, LIMITED PARTNERSHIP, Montreal (CA)

(72) Inventors: Basil D. Favis, Kirkland (CA); Pierre Le Corroller, Montreal (CA)

(73) Assignee: POLYVALOR, LIMITED PARTNERSHIP, Montreal (CA)

( * ) Notice: Subject to any disclaimer, the term of this patent is extended or adjusted under 35 U.S.C. 154(b) by 0 days.

(21) Appl. No.: 14/360,360

(22) PCT Filed: Nov. 22, 2012

(86) PCT No.: PCT/CA2012/050839
§ 371 (c)(1),
(2) Date: May 23, 2014

(87) PCT Pub. No.: WO2013/075241
PCT Pub. Date: May 30, 2013

(65) Prior Publication Data
US 2015/0031837 A1     Jan. 29, 2015

Related U.S. Application Data

(60) Provisional application No. 61/563,202, filed on Nov. 23, 2011.

(51) Int. Cl.
| | |
|---|---|
| C08L 23/00 | (2006.01) |
| C08L 23/12 | (2006.01) |
| C08L 23/16 | (2006.01) |
| C08L 23/04 | (2006.01) |
| C08L 23/10 | (2006.01) |
| C08J 11/06 | (2006.01) |
| B29B 9/00 | (2006.01) |
| C08J 3/00 | (2006.01) |
| C08L 23/06 | (2006.01) |
| B29K 101/12 | (2006.01) |
| B29K 105/26 | (2006.01) |

(52) U.S. Cl.
CPC ............... *C08L 23/12* (2013.01); *B29B 9/00* (2013.01); *C08J 3/005* (2013.01); *C08J 11/06* (2013.01); *C08L 23/04* (2013.01); *C08L 23/06* (2013.01); *C08L 23/10* (2013.01); *C08L 23/16* (2013.01); *B29K 2101/12* (2013.01); *B29K 2105/26* (2013.01); *C08J 2323/06* (2013.01); *C08J 2323/10* (2013.01); *C08J 2323/12* (2013.01); *C08J 2423/12* (2013.01); *C08J 2423/16* (2013.01); *C08J 2425/06* (2013.01); *C08J 2433/12* (2013.01); *C08J 2469/00* (2013.01); *C08L 2205/035* (2013.01); *C08L 2207/53* (2013.01); *Y02W 30/701* (2015.05)

(58) Field of Classification Search
CPC .................................................... C08L 23/12
See application file for complete search history.

(56) References Cited

U.S. PATENT DOCUMENTS

| 6,077,904 | A | * | 6/2000 | Dalgewicz, III | .... | B29C 49/0005 |
|---|---|---|---|---|---|---|
| | | | | | | 524/401 |
| 2005/0038185 | A1 | * | 2/2005 | Sullivan | ................... | C08J 3/005 |
| | | | | | | 525/63 |
| 2009/0018248 | A1 | * | 1/2009 | Pirri | ........................ | C08K 9/08 |
| | | | | | | 524/425 |

OTHER PUBLICATIONS

Virgilio et al , Macromolecules, 2009, 42, 7518-7529.*
Valera et al, Macromolecules 2006, 39, 2663-2675.*
Bhadane, P. A., et al., "Continuity development in polymer blends of very low interfacial tension," Polymer, vol. 47, pp. 2760-2771, 2006.
Chen, H. Y., et al., "Olefin Block Copolymers as Polyolefin Blend Compatibilizer," Antec, 2008.
Dai, C. A., et al, "Reinforcement of Polymer Interfaces with Random Copolymers", The American Physical Society: Physical Review Letters, vol. 73, No. 18, pp. 2472-2475, 1994.
D'Orazio, L., et al., "Effect of Addition of Ethylene-Propylene Random Copolymers on the Properties of High Density Polyethylene/Isotactic Polypropylene Blends: Part1. Morphology and Impact Behaviour of Moulded Samples," Polymer Engineering Science, vol. 22, pp. 536-544, 1982.
EPA. U.S Environment Protection Agency, "Municipal Solid Waste Generation, Recycling, and Disposal in the United States: Facts and Figures for 2008," Washington DC2009.
Kamdar, A. R. et al., "Effect of Chain Blockiness on the Phase Behavior of Ethylene-Octene Copolymer Blends," Journal of Physical Science.part B: Polymer Physics, vol. 47, pp. 1554-1572, 2009.
Le Corroller, P. and B. D. Favis, "Droplet-in-Droplet Polymer Blend Microstructures: a Potential Route Toward the Recycling of Comingled Plastics", Macromolecule Chemistry and Physics, vol. 213, pp. 2062-2074, 2012.
Lee, M. S., et al., "Can Random Copolymers Serve as Effective Polymeric Compatibilizers?," Journal of Polymer Science.part B: Polymer Physics, vol. 35, pp. 2835-2842, 1998.

(Continued)

*Primary Examiner* — Irina Krylova
(74) *Attorney, Agent, or Firm* — Isabelle Pelletier (57) ABSTRACT

There is provided a polymeric material comprising: a co-continuous or highly-continuous blend of polyethylene and polypropylene, the blend comprising a polyethylene phase and a polypropylene phase separated by a polyethylene/polypropylene interface; and one or more thermoplastics other than polyethylene and polypropylene, the one or more thermoplastics each having an interfacial tension with polypropylene higher than the interfacial tension of the polyethylene/polypropylene interface, wherein the one or more thermoplastics form discrete phases that are encapsulating each other, and wherein said discrete phases are comprised within the polypropylene phase of the co-continuous or highly-continuous blend or are located at the polyethylene/polypropylene interface. There is also provided a process for recycling a blend of thermoplastics comprising polyethylene, polypropylene and one or more other thermoplastics, the process comprising the step of melting and mixing the polyethylene, the polypropylene and the one or more other thermoplastics, thereby producing a polymeric material.

14 Claims, 4 Drawing Sheets

(56) References Cited

OTHER PUBLICATIONS

Lin, Y., et al., "Comparison of Olefin Copolymers as Compatibilizers for Polypropylene and High-Density Polyethylene," Journal of Applied Polymer Science, vol. 113, pp. 1945-1952, 2009.
Lyatskaya, Y., et al., "Designing Compatibilizers to Reduce Interfacial Tension in Polymer Blends", J. Phys. Chem., (1996), vol. 100, pp. 1449-1458.
Reignier, J. and B. D. Favis, "Control of the Subinclusion Microstructure in HDPE/PS/PMMA Ternary Blends," Macromolecules, vol. 33, pp. 6998-7008, 2000.
Sarazin, P. and B. D. Favis, "Morphology Control in a Co-continuous Poly(L-lactide)/Polystyrene blend: A Route Toward Highly Structured and Interconnected porosity in Poly(L-lactide) Materials," Biomacromolecules, vol. 4, pp. 1669-1679, 2003.
Shashoua, Y., "Saving plastics for posterity," Nature, vol. 455, pp. 288-289, 2008.
Souza, A. M. C. and N. R. Demarquette, "Influence of coalescence and Interfacial Tension on the Morphology of PP/HDPE compatibilized blends," Polymer, vol. 43, pp. 3959-3967, 2002.
Tchomakov, K. R. et al., "Mechanical Properties and Morphology of Ternary PP/EPDM/PE Blends", The Canadian Journal of Chemical Engineering, vol. 83, pp. 300-309, 2005.
Teh, J. W. and A. Rudin, "A Review of Polyethylene-Polypropylene Blends and Their Compatibilization," Advances in Polymer Technology, vol. 13, pp. 1-23, 1994.
Virgilio, N., et al., "Novel Self-Assembling Close-Packed Droplet Array at the Interface in ternary Polymer Blends," Macromolecules, vol. 42, pp. 3405-3416, 2009.
Virgilio, N., et al., "In Situ Measure of Interfacial Tensions in Ternary and Quaternary Immiscible Polymer Blends Demonstrating Partial Wetting," Macromolecules, vol. 42, pp. 7518-7529, 2009.
Wegner, G. and K. Wagemann, "Polymers and the Environment-Current Problems and Future Research," Advanced Materials, vol. 6, pp. 629-634, 1994.
Zhenhua, Y. and B. D. Favis, "Coarsening of Immiscible Co-Continuous Blends During Quiescent Annealing," AICHe Journal, vol. 51, pp. 271-280, 2005.
International Search Report, Feb. 18, 2013.
International Preliminary Report on Patentability, Jun. 5, 2014.

* cited by examiner

POLYMERIC MATERIAL AND PROCESS FOR RECYCLING PLASTIC BLENDS

CROSS-REFERENCE TO RELATED APPLICATIONS

This application is a National Entry Application of PCT application no PCT/CA2012/050839 filed on Nov. 22, 2012 and published in English under PCT Article 21(2), which itself claims benefit of U.S. provisional application Ser. No. 61/563,202, filed on Nov. 23, 2011. All documents above are incorporated herein in their entirety by reference.

FIELD OF THE INVENTION

The present invention relates to a process for recycling blends of plastics and to a new polymeric material having a microstructure where one or more thermoplastics are serially encapsulated in one phase of a biphasic polymeric blend. Also, the present invention is concerned with this polymeric material when it is produced by the process for recycling blends of plastics.

CONTEXT OF THE INVENTION

Nowadays, the worldwide plastic production is 230 million tonnes and global sales exceed 300 billion dollars annually. Polyolefins, styrenic resins, PET and PVC represent 90% of the consumer waste plastic stream. In the US alone, non recyclable PS, PVC and engineering resins represent over 40% of the global sales. Furthermore, the market share occupied by non recyclable polymer blends is over 30%. Further, only about 30% of traditional thermoplastic polymers, i.e. HDPE, PP and PET, which are recyclable, are commonly recycled in North America. The non recycled plastic materials are currently disposed of by a variety of processes from landfill disposal to energy recovery through thermal and chemical treatments.

The recycling of a blend containing multiple plastics of different compositions is currently limited by the fact that plastics form immiscible phases with poor compatibility and interfacial adhesion. Thus, the problem of recycling co-mingled plastics is principally related to the multiple interfaces present in multi-component immiscible polymer blends. These interfaces present a locus for failure, which leads to very poor mechanical properties. Compounding this problem, new products are now more sophisticated and involve multiple phases and complex microstructures. As a result, the amount of emerging plastics such as engineering resins, copolymers and polymer blends has increased in the post-consumer plastic waste stream. The separation of plastic prior to recycling is costly and sometimes even impossible.

In terms of physical recycling, immiscible polymer blends are not compatible and thus tend to display poor mechanical properties. As a result, most of the time, an appropriate compatibilizer has to be employed. Today, no universal compatibilizer exists. In blends containing multiples plastics, the multiple interfaces present thus require multiple interfacial modifiers, which can be prohibitively expensive.

Therefore, for all these reasons, the recycling of co-mingled polymeric materials, especially by a process that does not require identification and sorting of the plastic components in the waste stream, is a real challenge.

SUMMARY OF THE INVENTION

In accordance with the present invention, there is provided:

1. A polymeric material comprising:
   a co-continuous or highly-continuous blend of polyethylene and polypropylene, the blend comprising a polyethylene phase and a polypropylene phase separated by a polyethylene/polypropylene interface; and
   one or more thermoplastics other than polyethylene and polypropylene, the one or more thermoplastics each having an interfacial tension with polypropylene higher than the interfacial tension of the polyethylene/polypropylene interface,
   wherein the one or more thermoplastics form discrete phases that are encapsulating each other, and
   wherein said discrete phases are comprised within the polypropylene phase of the co-continuous or highly-continuous blend or are located at the polyethylene/polypropylene interface.

2. The polymeric material of item 1, wherein the polyethylene/polypropylene interface is compatibilized by an interfacial agent and said discrete phases are comprised within the polypropylene phase of the co-continuous or highly-continuous blend.

3. The polymeric material of item 2, wherein the interfacial agent is an ethylene-propylene-diene elastomer or a random ethylene-propylene copolymer.

4. The polymeric material of item 3, wherein the interfacial agent is an unvulcanized random ethylene-propylene-diene elastomer.

5. The polymeric material of any one of items 1 to 4, wherein the co-continuous or highly-continuous blend comprises polyethylene and polypropylene in a 0.5:0.5 weight ratio.

6. The polymeric material of any one of items 1 to 5, wherein the polyethylene in the co-continuous or highly-continuous blend is high density polyethylene.

7. The polymeric material of any one of items 1 to 6, wherein the one or more other thermoplastics are, independently from one another, one or more of a polycarbonate polymer, an acrylic polymer, polystyrene or another styrenic polymer, polyvinylchlroride or a derivative thereof, or a polyester.

8. The polymeric material of item 7, wherein the one or more other thermoplastics are polycarbonate, polymethylmethacrylate, and polystyrene, the polystyrene encapsulating the polymethylmethacrylate and the polymethylmethacrylate encapsulating the polycarbonate.

9. The polymeric material of item 8 comprising a total of about 20% by weight of the one or more other thermoplastics based on the weight of the polymeric material.

10. A process for recycling a blend of thermoplastics comprising polyethylene, polypropylene and one or more other thermoplastics, the process comprising the step of melting and mixing the polyethylene, the polypropylene and the one or more other thermoplastics, thereby producing a polymeric material.

11. The process of item 10, further comprising the step of mixing the polyethylene, the polypropylene and the one or more other thermoplastics prior to the melting and mixing step.

12. The process of item 10 or 11, wherein the melting and mixing step is carried out in an internal mixer.

13. The process of item 10 or 11, wherein the melting and mixing step is carried out in a twin screw extruder.

14. The process of any one of items 10 to 13, further comprising the step of feeding the polymeric material to an injection system.

15. The process of any one of items 10 to 13, further comprising the step of granulating and drying the polymeric material.

16. The process of any one of items 10 to 15, wherein the polymeric material produced is a polymeric material according to any one of items 1 to 9.
17. The process of any one of items 10 to 16, wherein the melting and mixing step is carried out in presence of an interfacial agent.

DETAILED DESCRIPTION OF THE INVENTION

Polymeric Material

Turning now to the invention in more details, there is provided a new polymeric material. This material involves the thermoplastics most commonly used in industry. This new material was conceived as a result of the inventor's research for a process for recycling industrial thermoplastics as they are found in the waste stream, i.e. co-mingled.

This new material comprises a co-continuous or highly-continuous blend of polyethylene and polypropylene, this blend comprising a polyethylene phase and a polypropylene phase separated by a polyethylene/polypropylene interface.

Herein, a "co-continuous blend" means a blend comprising two interpenetrating phases dispersed in one another, wherein the domains of each phase are all interconnected. Herein, a "highly-continuous blend" means a blend comprising two interpenetrating phases dispersed in one another, wherein the domains of each phases are mostly interconnected.

The degree of continuity of a blend can be expressed using the percent of either phase than can be selectively solvent-extracted. In a co-continuous blend, when a solvent is used to selectively extract one of the phase, almost all of this phase is extracted leaving behind a porous network containing almost only the other phase. The same is true when the other phase is extracted. Therefore, in embodiments, more that about 95%, 96%, 97%, 98% or about 100% (by weight) of each of the phases of a co-continuous blend can be selectively solvent-extracted. In highly continuous blends, less of each phase can be selectively extracted using a solvent because not all the domains of each phase are interconnected. Therefore, in embodiments, more than about 50%, 55%, 60%, 65%, 70%, 75%, 80%, 85% or 90% (by weight) of each of the phases of a highly-continuous blend can be selectively solvent-extracted.

The polyethylene in the co-continuous or highly-continuous blend can be any polyethylene. Polyethylene is indeed classified into several different categories based mostly on its density and branching. These categories include:
Ultra high molecular weight polyethylene (UHMWPE),
Ultra low molecular weight polyethylene (ULMWPE or PE-WAX),
High molecular weight polyethylene (HMWPE),
High density polyethylene (HDPE),
High density cross-linked polyethylene (HDXLPE),
Cross-linked polyethylene (PEX or XLPE),
Medium density polyethylene (MDPE),
Linear low density polyethylene (LLDPE),
Low density polyethylene (LDPE) and
Very low density polyethylene (VLDPE).

The polyethylene can be any of the above polyethylene as well as mixtures thereof. In embodiments, the polyethylene in the co-continuous or highly-continuous blend is high density polyethylene (HDPE). The polyethylene forms one of the two phases of the co-continuous or highly-continuous blend.

The polypropylene forms the other of the two phases of the co-continuous or highly-continuous blend. The polypropylene in the co-continuous or highly-continuous blend can be any polypropylene. Polypropylene indeed exists in different tacticity, crystallinity and density. The polypropylene can be any of those as well as mixtures thereof.

Herein, the "polyethylene/polypropylene interface" is the interface between the polyethylene phase and the polypropylene phase of the co-continuous or highly-continuous blend. This interface, like all interfaces, possesses an interfacial tension. In general, the interfacial tension of an interface in a polymer blend affects the morphology and the mechanical properties of the blend. The greater the interfacial tension, the less cohesive the material.

In embodiments of the invention, the polyethylene/polypropylene interface is compatibilized by an interfacial agent. This reduces the interfacial tension of the polyethylene/polypropylene interface. In embodiments, the interfacial agent is an ethylene-propylene-diene elastomer or a random ethylene-propylene copolymer. In more specific embodiments, the interfacial agent is an unvulcanized random ethylene-propylene-diene elastomer such as EPDM T2450 sold by Lanxess Bayer.

The material of the invention also comprises one or more thermoplastics other than polyethylene and polypropylene.

These thermoplastics each have an interfacial tension with polypropylene higher than the interfacial tension of the polyethylene/polypropylene interface. This means that if, for example, one of the other thermoplastics is polystyrene (PS), the PS/PP interface has an interfacial tension higher than the interfacial tension of the PE/PP interface.

Herein, "thermoplastics" are polymers that turn to a liquid when heated. Non-limiting examples of thermoplastics include:
Celluloids—a class of compounds created from nitrocellulose and camphor, plus dyes and other agents;
Cellulose acetate and other cellulose-based thermoplastics;
Cyclic olefin copolymers (COC)—There are several types of commercial cyclic olefin copolymers based on different types of cyclic monomers and polymerization methods. Cyclic olefin copolymers are produced by chain copolymerization of cyclic monomers such as 8,9,10-trinorborn-2-ene (norbornene) or 1,2,3,4,4a,5,8,8a-octahydro-1,4:5,8-dimethanonaphthalene (tetracyclododecene) with ethane;

Fluoropolymers—fluorocarbon based polymers with multiple strong carbon-fluorine bonds. Examples of fluoropolymers include PVF (polyvinylfluoride), PVDF (polyvinylidene fluoride), PTFE (polytetrafluoroethylene), PCTFE (Kel-F, CTFE) (polychlorotrifluoroethylene), PFA (perfluoroalkoxy polymer), FEP (fluorinated ethylene-propylene), ETFE (polyethylenetetrafluoroethylene), ECTFE (polyethylenechlorotrifluoroethylene), FFPM/FFKM (Perfluorinated Elastomer [Perfluoroelastomer]), FPM/FKM (Fluorocarbon [Chlorotrifluoroethylenevinylidene fluoride]; PFPE (Perfluoropolyether); Nafion™ (a sulfonated tetrafluoroethylene based fluoropolymer-copolymer), and Perfluoropolyoxetane;

Kydex™ polymers—a line of thermoplastic acrylic-polyvinyl chloride alloy sheet grades. It is frequently used as an alternative to leather in the production of firearm holsters and sheaths for knives. KYDEX™ Thermoplastic Sheet is a registered trademark of KYDEX, LLC;

Polyoxymethylene (POM, $[-CH_2-O-]_n$ as known as acetal, polyacetal, and polyformaldehyde)—an engineering thermoplastic used in precision parts that require high stiffness, low friction and excellent dimensional stability;

Acrylate polymers (as known as acrylics or polyacrylates)—a group of polymers noted for their transparency and resistance to breakage and elasticity. These are based on acrylate monomers, non-limiting examples of which include: acrylic acid, methyl methacrylate, acrylonitrile, methacrylates, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate (TMPTA), etc.;

Polyacrylonitriles (PAN) (a specific acrylate polymer) and its copolymers and derivatives—A resinous, fibrous, or rubbery organic polymer. Polyacrylonitrile resins are typically copolymers made from mixtures of monomers with acrylonitrile as the main component;

Polyamides (PA)—homopolymer or copolymers containing monomers of amides joined by peptide bonds. They can be made artificially through step-growth polymerization or solid-phase synthesis, examples being nylons, aramids, and sodium poly(aspartate). Polyamides are commonly used in textiles, automotives, carpet and sportswear due to their extreme durability and strength. Polyamides include: aliphatic polyamides (with an aliphatic main chain, examples Nylon™ from DuPont); polyphthalamides (with a semi-aromatic main chain, examples: Trogamid™ from Evonik Industries and Amodel™ from Solvay); and aramides=polyamides with an aromatic main chain, examples: Kevlar™ and Nomex™ from DuPont, Teijinconex, Twaron™ and Technora™ from Teijin, Kermel™ from Kermel);

Polyamide-imides (PAI)—polymers comprising amide-containing monomers and imide-containing monomers. Polyamide-imides are produced by Solvay Advanced Polymers under the trademark Torlon™;

Polyarylethers;

Polyaryletherketones (PAEK)—a family of semi-crystalline thermoplastics with high-temperature stability and high mechanical strength. PAEK plastics are characterized by phenylene rings that are linked via oxygen bridges (ether and carbonyl groups (ketone)). The plastics that fall within this family include: PEK (Polyether ketone), PEEK (Polyether ether ketone), PEKK (Polyether ketone ketone), PEEKK (Polyether ether ketone ketone), and PEKEKK (polyether ketone ether ketone ketone);

Polycarbonates (PC)—polymers containing carbonate groups (—O—(C=O)—O—). They are known by the trademarked names Lexan™, Makrolon™, Makroclear™ as well as others;

Polyalkylene oxides, such as polyethylene oxide (PEO) and polypropylene oxide (PPO);

Polyketones (PK)—a family of high-performance thermoplastic polymers. The polar ketone groups in the polymer backbone of these materials gives rise to a strong attraction between polymer chains, which increases the material's melting point (255° C. for Shell Chemicals' Carilon™). Such materials also tend to resist solvents and have good mechanical properties. The ethylene-carbon monoxide co-polymer is most significant polymer of this family;

Polyesters—A category of polymers which contain the ester functional group in their main chain. Non-limiting examples of polyesters are:

| Main chain | Number repeating units | Examples |
|---|---|---|
| Aliphatic | Homopolymer | Polyglycolide or Polyglycolic acid (PGA)-a biodegradable, thermoplastic polymer and the simplest linear, aliphatic polyester.  Polylactic acid (PLA) (polyactides)-thermoplastic aliphatic polyesters derived from renewable resources, such as corn starch (in the United States), tapioca products (roots, chips or starch mostly in Asia) or sugarcanes (in the rest of world).  Polylactones and polycaprolactones (PCL)-biodegradeable polyesters prepared from lactones, such as ε-caprolactone. The most common |

| Main chain | Number repeating units | Examples |
|---|---|---|
| | | use of polycaprolactone is in the manufacture of specialty polyurethanes. |
| | Copolymer | Polyethylene adipate (PEA) Polyhydroxyalkanoates (PHA)-linear polyesters produced in nature by bacterial fermentation of sugar or lipids. They are produced by the bacteria to store carbon and energy. More than 150 different monomers can be combined within this family to give materials with extremely different properties. These plastics are biodegradeable and are used in the production of bioplastics. |
| Semi-aromatic | Copolymer | Polyethylene terephtalate (PET)-used in synthetic fibers; beverage, food and other liquid containers; thermoforming applications; and engineering resins often in combination with glass fiber. The term "polyester" as a specific material most commonly refers to polyethylene terephthalate (PET). Polybutylene terephthalate (PBT)- a thermoplastic engineering polymer used as an insulator in the electrical and electronics industries. It is a thermoplastic (semi)-crystalline polymer. Polytrimethylene terephthalate (PTT)- a polymer made from two monomer units: 1,3-propanediol and terephthalic acid or dimethyl terephthalate. Similar to polyethylene terephthalate, the PTT is used to make carpet fibers. Polyethylene naphthalate (PEN) (Poly(ethylene 2,6-naphthalate)-a polyester with good barrier properties. It is particularly well-suited for bottling beverages that are susceptible to oxidation, such as beer. It is also used in making high performance sailcloth. |
| Aromatic | Copolymer | Liquid Crystal Polymers (LCP)-a class of aromatic polyester polymers. They are unreactive, inert, and resistant to fire. LCPs are sold by manufacturers under a variety of trade names including Vectran™ and Zenite™ 5145L. | as well as polycyclohexylene dimethylene terephthalate (PCT)—a thermoplastic polyester formed from the polycondensation of terephthalic acid and cyclohexylene-dimethanol;

Polyetherimide (PEI)—an amorphous, amber-to-transparent thermoplastic with characteristics similar to the related plastic PEEK;

Polyimides (PI)—polymers made of imide monomers. Polyimides have been in mass production since 1955. Typical monomers include pyromellitic dianhydride and 4,4'-oxydianiline. The polyimide materials are lightweight, flexible, resistant to heat and chemicals. Therefore, they are used in the electronics industry for flexible cables, as an insulating film on magnet wire and for medical tubing;

Polymethylpentene (PMP)—a thermoplastic polymer of methylpentene monomer units:

It is used for gas permeable packaging, autoclavable medical and laboratory equipment, microwave components, and cookware. It is commonly called TPX™, which is a trademark of Mitsui Chemicals;

Poly(p-phenylene oxide) (PPO) also called poly(p-phenylene ether) (PPE)—a high-temperature thermoplastic. It is mainly used as blend with polystyrene, high impact styrene-butadiene copolymer or polyamide:

Polyphenylene sulfide (PPS)—an organic polymer consisting of aromatic rings linked with sulfides:

Polysulfone (PSU) and Polyethersulfones (PES)—two families of thermoplastic polymers. These polymers are known for their toughness and stability at high temperatures. They contain the subunit aryl-SO$_2$-aryl, the defining feature of which is the sulfone group;

Polyurethane (PU)—A polyurethane (PUR and PU) is any polymer composed of a chain of organic units joined by carbamate (urethane) links. These polymers have several industrial applications; and Vinyl polymers—Vinyl polymers are a group of polymers derived from vinyl monomers. Their backbone is an extended alkane chain, made by polymerizing an alkene group (C=C) into a chain (. . . —C—C—C—C— . . . ). In popular usage, "vinyl" refers only to polyvinyl chloride (PVC). Vinyl polymers are the most common type of plastic. Non-limiting examples include the following:

Polymerized simple alkenes: polyethylene from ethene, polypropylene from propene and polybutadiene from butadiene;

Polystyrene (PS) and other styrenic polymers—made from styrene or "vinyl benzene";

Polyvinyl chloride (PVC) made by polymerization of the monomer vinyl chloride (chloroethene) CH$_2$=CHCl;

Polyvinylidene chloride (PVDC) prepared from 1,1-dichloroethylene (CH$_2$=CCl$_2$);

Polyvinyl acetate (PVAc) made by polymerization of vinyl acetate;

Polyvinyl alcohol (PVA) produced by hydrolysis of polyvinyl acetate;

Polyvinyl carbazoles;

Polybutylene (polybutene-1, poly(1-butene), PB-1)—a polyolefin or saturated polymer with the chemical formula $(C_4H_8)_n$. It is produced by polymerisation of 1-butene. When applied as a pure or reinforced resin, it can replace materials like metal, rubber and engineering polymers. It is also used synergistically as a blend element to modify the characteristics of other polyolefins like polypropylene and polyethylene;

Polyacrylonitrile prepared from acrylonitrile;

Acrylonitrile butadiene styrene copolymer (ABS)—chemical formula $(C_8H_8)_x.(C_4H_6)_y.(C_3H_3N)_z$;

Ethylene-vinyl acetate (EVA)—A copolymer of ethylene and vinyl acetate. The weight percent vinyl acetate usually varies from 10 to 40%, with the remainder being ethylene;

Ethylene vinyl alcohol (EVOH)—A copolymer of ethylene and vinyl alcohol;

Styrene-acrylonitrile (SAN)—a copolymer plastic prepared from styrene and acrylonitrile, as well as derivatives, copolymers, composites and blends thereof.

Further included are substantially water-insoluble thermoplastic alpha-olefin copolymers. Examples of such copolymers are alkylene/vinyl ester-copolymers as ethylene/vinyl acetate-copolymers (EVA), ethylene/vinyl alcohol-copolymers (EVAL); alkylene/acrylate or methacrylate-copolymers preferably ethylene/acrylic acid-copolymers (EAA), ethylene/ethyl acrylate-copolymers (EEA), ethylene/methyl acrylate-copolymers (EMA); alkylene/maleic anhydride-copolymers preferably ethylene/maleic anhydride-copolymers; as well as mixtures thereof.

Further included are styrenic copolymers, which comprise random, block, graft or core-shell architectures. Examples of such styrenic copolymers are alpha-olefin/styrene-copolymers preferably hydrogenated and non-hydrogenated styrene/ethylene-butylene/styrene copolymers (SEBS), styrene/ethylene-butadiene copolymers (SEB); styrene acrylonitrile copolymers (SAN), acrylonitrile/butadiene/styrene copolymers (ABS); as well as mixtures thereof.

Further included are other copolymers such as acrylic acid ester/acrylonitrile copolymers, acrylamide/acrylonitrile copolymers, block copolymers of amide-esters, block copolymers of urethane-ethers, block copolymers of urethane-esters; as well as mixtures thereof.

Note that when the above families of polymers comprise both thermoplastics and thermosets, only the thermoplastics are concerned. Also note that although polyethylene and polypropylene are listed above as thermoplastics, which they are, the polymeric material of the invention comprises "one or more thermoplastics other than polyethylene and polypropylene". The polyethylene and polypropylene are nevertheless listed above as they can be parts of copolymers or derivatives, which would be "thermoplastics other than polyethylene and polypropylene".

In the polymeric material of the invention, the one or more thermoplastics form discrete phases that are serially encapsulating each other. The inventors have found that the thermoplastics assemble in a structure, wherein phases of the various thermoplastics encapsulate each other, like the different layers of an onion (a kind of droplet-in droplet structure). Examples of such structures can be seen in FIGS. 1 to 4, where, in most cases, one of the thermoplastic layers has been removed by extraction so that the layer underneath it can be seen. It is to be noted that sometimes thermoplastics that are miscible together will blend to form a single phase that will be encapsulated by and/or will encapsulate another thermoplastic. Such embodiments are part of the present invention.

In embodiments, the one or more thermoplastics are, independently from one another, one or more of a polycarbonate, an acrylic polymer, polystyrene or another styrenic polymer, or a polyester. In embodiments, the one or more thermoplastics comprise polycarbonate encapsulated by polymethylmethacrylate, which is itself encapsulated by polystyrene.

Figure 1:
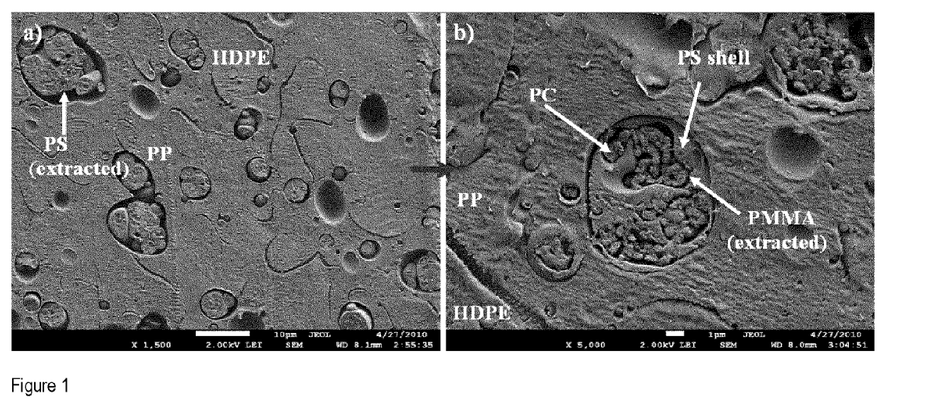
FIG. 1 shows SEM micrographs of HDPE/PP/PS/PMMA/PC 40/40/6.7/6.7/6.7 (% vol) without EPDM after melt blending by the internal mixer. a) PS phase has been selectively extracted with cyclohexane. White bar indicates 10 microns. b) High magnification where the PMMA phase has been removed with acetic acid. White bar indicates 1 micron.
Figure 2:
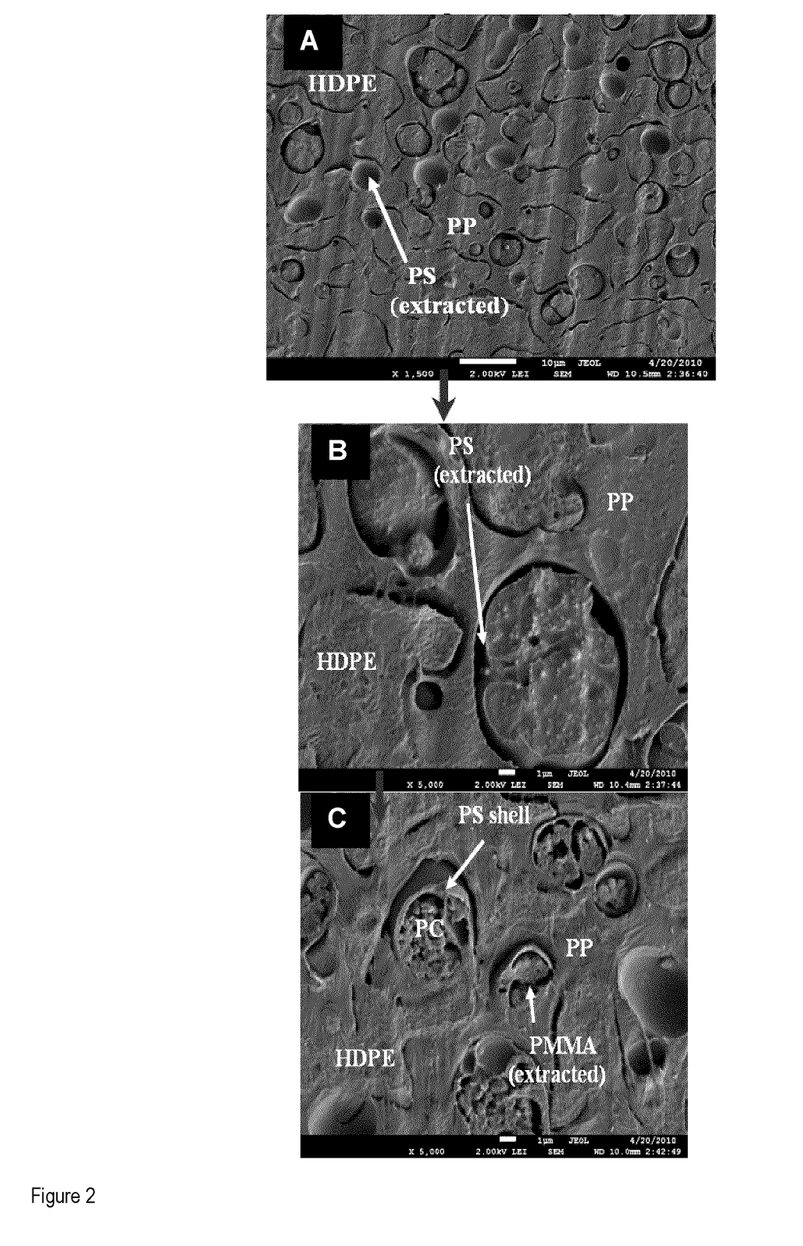
FIG. 2 shows SEM micrograph of compatibilized HDPE/PP/PS/PMMA/PC blends with 20% wt EPDM (based on PP) after melt blending by the internal mixer: PS extraction at A) low and B) high magnification and C) PMMA extraction.

In the material of the invention, the one or more other thermoplastics are comprised within the polypropylene phase of the co-continuous or highly-continuous blend or are located at the polyethylene/polypropylene interface. This means that the polyethylene phase of the co-continuous or highly-continuous blend does not contain the one or more other thermoplastics. FIG. 1A) shows a structure where the one or more other thermoplastics are located both within the polypropylene phase of the co-continuous or highly-continuous blend and at the polyethylene/polypropylene interface. FIG. 2A), where an interfacial agent has been used, shows a structure where the one or more other thermoplastics are located both within the polypropylene phase of the co-continuous or highly-continuous blend only.

The microstructure of the polymeric material of the invention substantially reduces the problem of multiple interfaces that generally cause problems when recycling plastic blends. Indeed, because of this microstructure, in the material of the invention, there is only one principal interface (PE/PP), which can be compatibilized as seen above; the other interfaces being relegated to minor roles as parts of the encapsulated thermoplastic system.

The respective amounts of polyethylene and polypropylene in the co-continuous or highly-continuous blend depend on the availability of the raw materials and the desired mechanical properties of the polymeric material to be produced. The more polyethylene the material comprises, the better its mechanical properties. On the other hand, the more polypropylene the material comprises, the greater the amount of the one or more other thermoplastics it can contain. In any case, the polyethylene and polypropylene should be present in amounts allowing the formation of a highly continuous or co-continuous blend. Having too much polyethylene will produce islands of polypropylene within a polyethylene matrix. Conversely, having too much polyethylene will produce islands of polyethylene within a polypropylene matrix. It is to be noted that the amount of polyethylene and polypropylene necessary to obtain a highly continuous or co-continuous blend, will affect the amount of the one or more other thermoplastics present in the polymeric material. In embodiments, the co-continuous or highly-continuous blend comprises polyethylene and polypropylene in a weight ratio varying from about 0.01:0.99 to 0.99:0.01. In more specific embodiments, the co-continuous or highly-continuous blend comprises polyethylene and polypropylene in a weight ratio varying from 0.1:0.9 to 0.9:0.1, from 0.2:0.8 to 0.8:0.2, from 0.3:0.7 to 0.7:0.3, or from 0.4:0.6 to 0.6:0.4. In more specific embodiments, the co-continuous or highly-continuous blend comprises polyethylene and polypropylene in a 1:1 weight ratio.

The amounts of the other thermoplastics present in the material of the invention depend on the availability of the raw materials and on the amount of polypropylene present. The more polypropylene the material comprises, the more it can contains of the one or more other thermoplastics. In embodiments, the material of the invention comprises up to about 60%, 50%, 40% or 30% by weight of the other thermoplastics based on the total weight of the material. In embodiments, the polymeric material comprises up to about 20% or about 20% by weight of other thermoplastics based on the total weight of the polymeric material. The above percentages refer to the sum of the percentage for all the other thermoplastics present. Therefore, when it is said that the material comprises about 20% by weight of other thermoplastics based on the total weight of the material; it can mean that it comprises, for example, about 6.7% of three different "other thermoplastics" or 10%, 5% and 5% of three different "other thermoplastics", or 18% and 2% of two different thermoplastics.

In embodiments, the material of the invention optionally comprises an antioxidant. Such compounds are very well known and can easily be selected and used by the skilled person.

Process for Recycling Co-mingled Thermoplastics

There is also provided a process for recycling a blend of thermoplastics comprising polyethylene, polypropylene and one or more other thermoplastics, the process comprising the step of melting and mixing the polyethylene, polypropylene and the one or more other thermoplastics, thereby producing a polymeric material.

The polymeric material produced by this process corresponds to the polymeric material described in the immediately preceding section. Therefore, the components in the blend of thermoplastics to be recycled are the same as the components in the above-described material and are present in corresponding quantities. This information is not repeated below as it is available above.

The process of the invention embodies a long sought-after industrial method for recycling mixed plastic waste. Indeed, when recycling polymers, the starting material is usually a mix of various thermoplastics (pure, already blended in products, in the form of composites, etc). Since both PE and PP comprise the majority of plastic waste, it is advantageous that they form the base of the above polymeric material.

Also, since a PE/PP system presents a very low interfacial tension, especially when compatibilized, this process is highly robust and is expected to be applicable to a wide range of thermoplastics. This approach is so robust because the system segregates and assembles spontaneously. When a compatibilizer is used, it specifically locates itself at the PE/PP interface, while the one or more other thermoplastics assemble in an ordered multi-encapsulation fashion exclusively within the PP phase. Even in the absence of a compatibilizer, the one or more other thermoplastics assemble in an ordered multi-encapsulated fashion within the PP phase or at the PE/PP interface. Moreover, the tensile mechanical properties of the polymeric material generally demonstrate very good and even improved tensile strength and modulus (see the Examples below). Furthermore, depending on the processing conditions, the elongation at break of the resulting material can be modulated as needed. In embodiments, the polymeric material has interesting mechanical potential for industrial applications (again see the Examples below). This process can therefore reduce the need for sorting polymeric materials prior to recycling and thus simplify the plastic material recovery process.

Without being bound by theory, it is believed that the formation of the multi-encapsulated microstructure is thermodynamically driven. As such, the present process constitutes a very robust method for recycling co-mingled plastics. For this reason, the process of the invention and the formation of the polymeric material of the invention are expected to be independent of the blending process. In fact, any methods that allow melting and mixing the blend of polymer can be used. In embodiments, the melting and mixing step is carried out in an internal mixer or in a twin screw extruder.

In embodiments, the blend of thermoplastic is first mixed in a dry state. Then, it is fed to the apparatus for mixing and blending. The above-described microstructure is typically obtained after one or two minutes. The resulting material can be directly fed to an injection system or it can be granulated and dried to be used later.

In embodiments, the melting and mixing step is carried out in the presence of an interfacial agent. Interfacial agents have been defined and described above. The skilled person will be able to select an interfacial agent and to use it in a proper amount. In embodiments, the interfacial agent is present in an amount varying from about 1% to about 50% by weight based on the total weight of the polypropylene. In more specific embodiments, the interfacial agent is present in an amount of about 20% by weight based on the total weight of the polypropylene.

Other objects, advantages and features of the present invention will become more apparent upon reading of the following non-restrictive description of specific embodiments thereof, given by way of example only with reference to the accompanying drawings.

Description of Illustrative Embodiments

The present invention is illustrated in further details by the following non-limiting examples.

Polystyrene (PS), polymethylmethacrylate (PMMA) and polycarbonate (PC) were bulk mixed within a high density polyethylene/polypropylene (HDPE/PP) co-continuous system. This produced a multiple 5 component system comprised of HDPE, PP, PS, PMMA and PC. Controlled polymer segregation allowed obtaining multiple non-recyclable phases within one of two major phases: i.e. PP. This reduced the polymer-polymer interactions to a principal HDPE/PP interface which was in turn compatibilized to better control the mechanical properties of the resulting material. In this fashion, it has been possible to reduce the problem of multiple interfaces in co-mingled plastics to one major compatibilized interface.

The morphology of this complex five-phase HDPE/PP/PS/PMMA/PC system compatibilized with interfacial agent (EPDM) was investigated. In this system, when the HDPE/PP interface is compatibilized, PS/PMMA/PC composite droplets are all exclusively located within PP. From SEM characterization and annealing procedures, it can be clearly seen the PS/PMMA/PC forms a hierarchical structure where PS encapsulates PMMA which in turn encapsulates the PC. The thermodynamic driving force and the compatibilization efficacy have been studied with the use of annealing procedures. The annealing process is simply used to better visualize the system and to demonstrate the stability of the structures. The impact on the microstructure of the blending process in various melt mixing environments such as in an internal mixer and in twin screw extrusion/injection has been examined. Finally, the mechanical uniaxial tensile properties have been analyzed and related to the corresponding morphology.

Experimental

Materials. Five commercial homopolymers and one copolymer were used. The homopolymers were high density polyethylene Sclair 2710 from Nova Chemicals, polypropylene PP PD702 from Basell, polystyrene 615 APR Styron from Dow, PMMA M30 from Evonik and Polycarbonate 1080HD Caliber from Dow. The physical properties of these homopolymers are given in Table 1.

TABLE 1

Homopolymer physical properties

| Polymer | Density at 25° C. ASTM D792[a] | Melt Index (g/10 min) ASTM D1238[a] | $M_w \times 10^{-3}$ (g/mol) | $\eta^* \times 10^{-3}$ (Pa · s), 225° C. 25 s$^{-1}$ | $\eta_o \times 10^{-3}$ (Pa · s), 225° C. |
|---|---|---|---|---|---|
| HDPE | 0.95 | 17 | 48[a] | 0.19 | 0.37 |
| PP | 0.90 | 35 | 288[c] | 0.16 | 0.5 |
| PS | 1.04 | 14 | 290[b] | 0.23 | 1.5 |
| PMMA | 1.19 | 24 (230° C./3.8 kg) | — | 0.5 | 1.9 |
| PC | 1.20 | 73 (300° C./1.2 kg) | — | 0.73 | 1.0 |

[a]Obtained from suppliers,
[b]Estimated from[7],
[c]Estimated from[17].

The copolymer used was of commercial grade as well. It was an unvulcanized random ethylene-propylene-diene elastomer with nearly symmetrical E/P molar composition supplied by Lanxess Bayer (hereinafter "EPDM"). This EPDM T2450 contains ethylidene norborene (ENB) as the diene with a composition between 3.4 and 4.5% wt. The physical properties of this copolymer are summarized in Table 2.

TABLE 2

Copolymer physical properties

| Polymer | EPDM T2450 |
|---|---|
| Density at 25° C. ASTM D792[a] | 0.86 |
| Melt Index (g/10 min) ASTM D1238[a] | — |
| % wt ethylene | 55-61% |
| $M_w \times 10^{-3}$ (g/mol) | 140[b] |
| Mooney viscosity ASTM D1646 (L 1 + 4 125° C.) | 29-41 M |
| $\eta_o \times 10^{-3}$ (Pa · s) at 225° C. | 6.8 |

[a]Obtained from suppliers,
[b]Estimated from[17].

Blend Preparation. Multiphase HDPE/PP/PS/PMMA/PC blends with a volume composition of 40/40/6.7/6.7/6.7 with either 0% or 20% copolymer (based on the weight of PP) were obtained via two mixing procedures:
1) a Brabender internal mixer from C.W. Brabender Instruments Inc., and
2) a co-rotating twin screw extruder, Leistritz ZSE 18HP, with an L/D ratio of 40.

A small amount (0.2% wt) of Irganox B225 antioxidant from Ciba-Geigy was added to the mixture to reduce thermal oxidation.

The internal mixer blend preparation was mixed at 225° C. and 50 rpm for 7 minutes under a nitrogen atmosphere after the materials were dried overnight. The average shear rate in the mixing chamber was estimated to be 30 s$^{-1}$, which corresponds to a frequency of 4 Hz. After mixing, the blend melt was gently pulled out of the chamber and rapidly quenched in a bath of cold water.

For the twin screw extrusion, the temperature profile was 180/190/200/210/220/225/210° C. (from hopper to die) and the screw speed was 80 rpm. The average residence time was around 1,5 minutes. The speed was selected in order to have a uniform extrudate at the exit of the die. Irganox B225 antioxidant was also employed in order to minimize the effect of thermal degradation. The melted threads were then quenched in a cold water bath and pelletized and dried prior to the injection molding step.

Quiescent annealing was conducted for both blending processes in order to better visualize the morphology. Annealing was carried out at 225° C. for 30 minutes for samples prepared by internal mixing which allowed for the observation of the equilibrium morphology. Annealing was carried out for only 1 minute for the extrusion/injection molded samples in order to observe the morphology directly produced by the melt processing step.

Injection Molding. The Dogbone specimens of type I (ASTM D638) were molded using a Sumimoto SE50S injection unit with a screw diameter of 32 mm. The temperature profile used was 190/200/215/220° C. from hopper to nozzle and the screw speed was 100 rpm. Two injection velocities were studied at a constant injection pressure of 80 MPa. The high and low injection speeds were set to 70 mm/s and 40 mm/s respectively for a mold filling over 85%. The mold temperature was set to 38° C. for a cooling time of 10 seconds. A low backpressure of 1 MPa was sufficient to process the materials and the total cycle time was measured to be around 37 seconds.

Scanning Electron Microscope Observations. The samples were microtomed using a Leica RM2165 microtome equipped with a liquid nitrogen cooling system. The dogbones were microtomed around the middle within the gauge region and parallel to the flow field. Microtomed surfaces were then submitted to a selective solvent etching during which one phase was extracted. At room temperature, cyclohexane and acetic acid were used to etch PS/EPDM and PMMA, respectively, without affecting the other phases. Prior to SEM observation, the samples were dried at 60° C. under vacuum in an oven and then coated with a gold-palladium alloy. The micrographs were obtained using a SEM-FEG JEOL JSM6500 at 2 kV and $10^{-6}$A in Scanning Electron Image (SEI) and Low Electron Image (LEI) mode.

Image Analysis and Measurements. SEM micrographs were analyzed in order to measure both the volume average, $d_v$, and number average, $d_n$, composite droplet diameters as well as to quantify the HDPE/PP co-continuous network.

The values of $d_n$ and $d_v$ were calculated using a digitalizing table from Wacom and SigmaScan v.5 software. The Saltikov correction procedure was used so as to take into account the effect of polydispersity and the fact that droplets are not cut exactly at their equator. The number of measured droplets used for each average diameter measurement varied between 300 and 500 depending on the phase structure size.

The HDPE/PP co-continuous network was quantified using a new procedure. Since it was not possible to extract one of these two phases, low magnification micrographs were used with the following assumption: the co-continuity galleries were considered as successions of cylinders. The diameter D was measured at constant intervals without taking into account the edges. The number of measurements ranged between 50 and 200 depending on the microstructure size.

Mechanical Properties—Tensile Tests. Tensile tests were carried out using an INSTRON 4400R with a 5kN load cell and type I dogbone in agreement with ASTM D638 procedure. The tensile velocity was set to 50 mm/min with a gauge length of 50 mm. The plot of stress versus strain was recorded and the engineering parameters listed accordingly.

Results

Morphology Obtained by Internal Mixing

Quenched Morphology

FIG. 1a) and b) shows the morphology of the uncompatibilized HDPE/PP/PS/PMMA/PC 40/40/6.7/6.7/6.7% vol blend (i.e. containing 0% copolymer) immediately after blending and quenching. With selective phase extraction, it is possible to determine the location for PS and PMMA. The identification of the HDPE regions is demonstrated by the surface texture. HDPE displays a rough surface due to crystalline lamellae (white regions) whereas PP can be associated with a smooth surface due to its lower crystallinity (darker regions). A phase hierarchy appears to have been clearly established where PS/PMMA/PC composite droplets ($d_n$=2.6 μm, $d_v$=9.7 μm) are located within the PP or at the HDPE/PP interface. The droplets are composed of a PS shell encapsulating a PMMA/PC co-continuous structure with PMMA preferably situated between PS and PC. The HDPE/PP forms a co-continuous network where no composite droplets are present within the HDPE, hence displaying a fully segregated behaviour. The phase size data for both the composite droplets and the HDPE/PP co-continuous phase for the uncompatibilized and compatibilized systems are summarized in Table 4.

FIG. 2 shows the effect of addition of the copolymer interfacial modifier to the HDPE/PP/PS/PMMA/PC system. The modifier was used with the intention of specifically compatibilizing the HDPE/PP interface. The addition of EPDM produces a fine HDPE/PP co-continuous structure (4.8 μm). Moreover, as can be seen in FIG. 2a), the EPDM leads to the complete segregation of PS/PMMA/PC composite droplets within the PP with almost no remaining amount at the HDPE/PP interface. Finally, a difference was noticed for the largest composite droplets in the system. When the EPDM is used, the composite droplet average volume diameter decreases from 9.7 to 7.8 μm. In terms of the smallest droplets (dn), no noticeable differences were observed between the phase sizes of the compatibilized and uncompatibilized systems.

TABLE 4

HDPE/PP co-continuous and PS/PMMA/PC composite droplets phase sizes

|  | Composite droplets phase size | | HDPE/PP co-continuity D |
|---|---|---|---|
|  | $d_N$ | $d_V$ |  |
| EPDM | 2.5 | 7.8 | 4.8 ± 1.2 |
| Without EPDM | 2.6 | 9.7 | 8.6 ± 2.3 |

Morphology Evolution after Quiescent Annealing

Quiescent annealing allows better visualizing of the morphology and the effect of the copolymer on the microstructure. Furthermore annealing allows demonstrating the thermodynamic stability of the complex structures formed and hence the robustness of the approach.

Annealing of the blends was carried out for 30 minutes at 225° C. As can be observed from FIG. 3, the phase sizes are considerably larger as would be expected with a quiescent annealing step. Apart from that, the essential features observed in the previous section are maintained: 1) composite droplet formation with a hierarchy of PS encapsulating PMMA and PC; and 2) a clear segregation of composite droplets to the PP phase.

Figure 3:
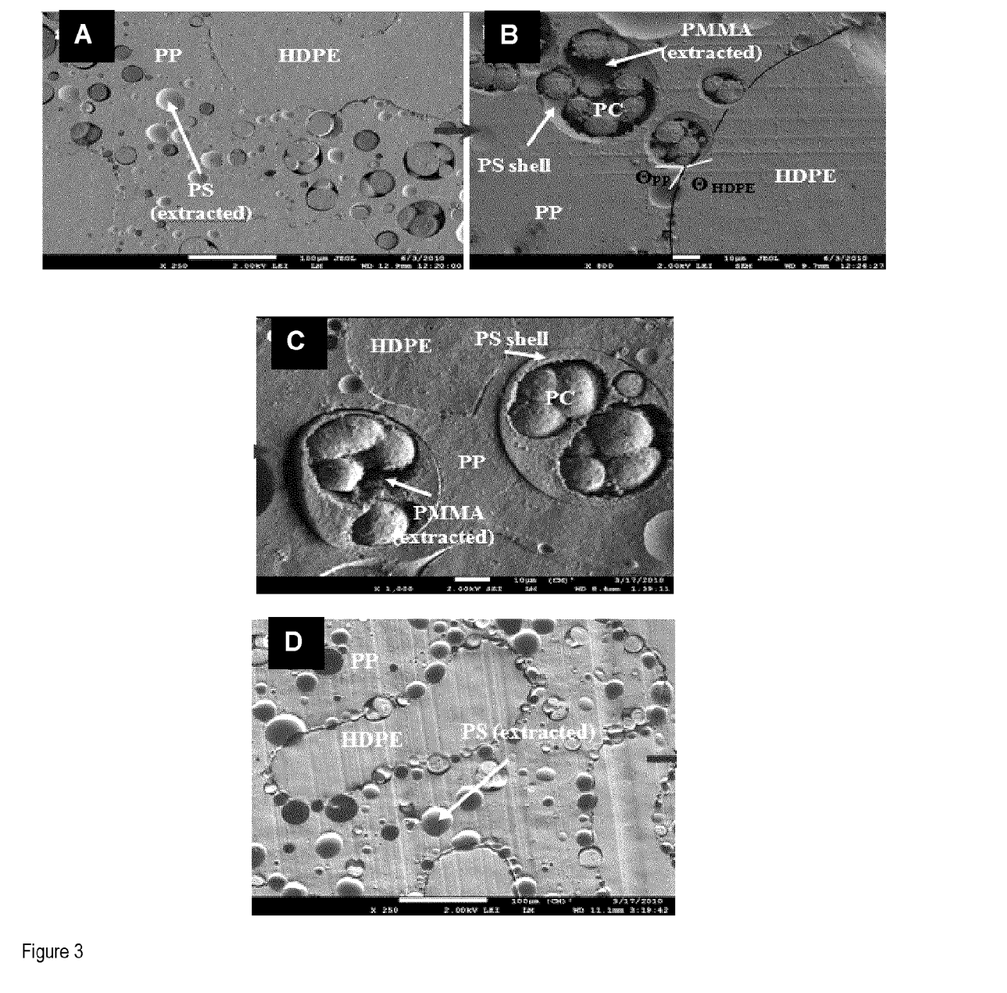
FIG. 3 shows SEM micrograph of the HDPE/PP/PS/PMMA/PC blends after 30 minutes annealing with A) 0% EPDM and B) 20% EPDM after PS extraction at low magnification. PMMA was selectively etched for D) 0% EPDM and, D) 20% EPDM at high magnification.

FIG. 3 also shows that the phase hierarchy tendency for the composite droplets is accentuated with a transition from co-continuity between PMMA and PC to PC multicores encapsulated by a PMMA shell which in turn is enveloped by a PS layer. The effect of the interfacial modifier copolymer is clear and, as was observed in the previous section, the composite droplets are now fully segregated within the PP when the EPDM is employed. The HDPE/PP interface has been highlighted in high magnification micrographs to better view phase boundaries. The composite droplet coverage density at the HDPE/PP interface can be summarized as uncompatibilized case >EPDM case. The uncompatibilized system displays a combination of both partial and complete engulfing of the composite droplets.

Due to the coarsening phenomena, both the HDPE/PP co-continuity and PS/PMMA/PC composite droplets phase sizes increased. It is well known that an efficient compatibilizer retards coarsening effects[12, 14, 15] and the EPDM appears to demonstrate good resistance to coarsening with the minimal co-continuous network average diameter (39.7 μm). Moreover, it allows for a significant phase size reduction of the largest composite droplets. This can be explained by the more effectively "immobilized" HDPE/PP interface during coarsening implying less coalescence for the droplets present in the PP region. The phase sizes are summarized in Table 5.

TABLE 5

HDPE/PP co-continuous and PS/PMMA/PC composite droplets phase sizes after 30 minutes annealing.

|  | Composite droplets phase size | | HDPE/PP co-continuity D |
|---|---|---|---|
|  | $d_N$ | $d_V$ |  |
| EPDM | 10.6 | 23.7 | 39.7 ± 9.5 |
| Without copolymer | 10.5 | 39.6 | 111 ± 33.8 |

Study on Twin Screw Extrusion followed by Injection with EPDM as Compatibilizer.

Morphology Observation

The morphology development in the 5-component blend system when prepared using the classical melt processing techniques of twin-screw extrusion and injection molding was examined.

Figure 4:
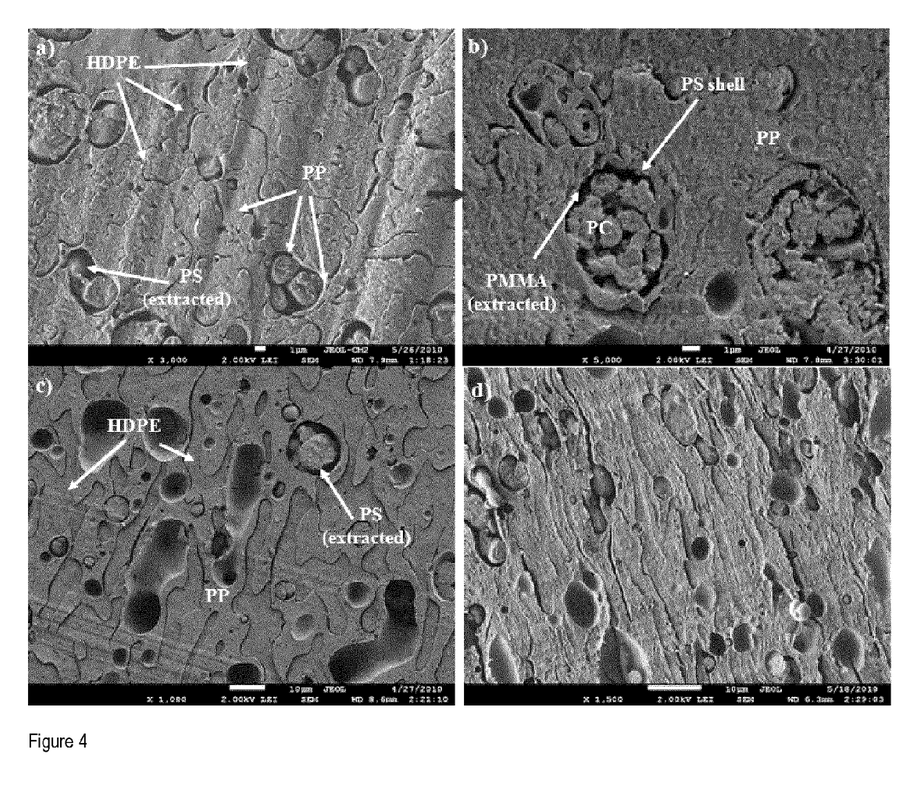
FIG. 4 shows SEM micrograph of the compatibilized HDPE/PP/PS/PMMA/PC blend with 20% EPDM after extrusion/injection at low speed: a) PS extraction at low magnification and b) PMMA etching at high magnification; c) after 1 minute annealing, PS has been extracted; d) at higher injection speed, PS has been extracted and reveals ellipsoidal microstructure. In a) and b) the white scale bar equals 1 micron; in c) and d) the scale bar is 10 microns.

FIG. 4 presents the micrograph of the compatibilized HDPE/PP/PS/PMMA/PC blend (40/40/6.7/6.7/6.7 with 20% wt EPDM with respect to the PP phase) after twin-screw extrusion and injection molding in the dogbone gauge region parallel to the flow direction. It is interesting to notice that phase hierarchy is conserved after injection molding (compared to that observed for the blend produced using the internal mixer) despite the different processing. The main difference is the presence of a finer microstructure: the HDPE/PP co-continuous network average diameter measures 1.6 μm and PS/PMMA/PC composite droplets number average and volume average diameter are 1.5 μm and 6.4 μm, respectively (2.5 and 7.8 μm for the uncompatibilized system). These results confirm the dominance of the interfacial free energies on the establishment of the microstructure.

The composite droplet particles after twin-screw extrusion and injection molding are larger than the thickness of the co-continuous network. Due to the fine scale of the structures, it is difficult in FIG. 4a) and b) to determine the position of the composite droplet with respect to polypropylene. However, after 1 minute annealing (FIG. 4c)), the hierarchy and the droplet segregation within the PP phase become much clearer. Thus, the segregation and encapsulation hierarchy are unaffected by processing conditions and even by significant changes in the phase size. Injecting at higher speed induces an oriented fibrillation of both the HDPE/PP co-continuity and the composite dispersed phase in the injection flow direction (see FIG. 4d)).

Mechanical Properties: Uniaxial Tensile Test

The effect of blend microstructure on mechanical properties was examined. The tensile properties are presented in Table 6.

composite droplets within the PP phase, hence reducing the amount of interactions to a major HDPE/PP interface.

Control over mechanical properties can be achieved by varying the injection speed which strongly affects the orientation of the materials in the flow direction.

Although the present invention has been described hereinabove by way of specific embodiments thereof, it can be modified, without departing from the spirit and nature of the subject invention as defined in the appended claims.

REFERENCES

The present description refers to a number of documents, the content of which is herein incorporated by reference in their entirety. These documents include, but are not limited to, the following:

[1] L. A. Utracki, *Polymer alloys and blends*. Tokyo: CMC Press, 1990.
[2] C. Harrats, and al., *Micro and nanostructured multiphase polymer blend systems: phase morphology and interfaces*. Boca Raton: Taylor & Francis, CRC Press, 2006.

TABLE 6

Tensile parameters of multiphase HDPE/PP/PS/PMMA/PC/EPDM blends.

| | Young Modulus (MPa) | Elongation At Break (%) | Break Stress (MPa) | Break Energy (J) | Yield Stress (Mpa) | Yield def. (%) |
|---|---|---|---|---|---|---|
| HDPE | 416 | 531 | 8.5 | 126 | 8.7 | 2.9 |
| PP | 565 | 630 | 16 | 211 | 14.5 | 3.2 |
| HDPE/PP | 571 | 288 | 14.6 | 79.1 | 12.3 | 3 |
| HDPE/PP/EPDM | 443 | 481 | 12.4 | 113 | 10 | 3 |
| HDPE/PP/PS/PMMA/PC | 679 | 11.1 | 26.8 | 7.6 | 15.4 | 3.1 |
| HDPE/PP/PS/PMMA/PC/EPDM Low injection speed | 550 | 14.5 | 23.1 | 4.8 | 10.8 | 2.8 |
| HDPE/PP/PS/PMMA/PC/EPDM High injection speed | 592.0 | 41.6 | 19.1 | 16.6 | 13.1 | 3.0 |

The compatibilized HDPE/PP/PS/PMMA/PC system was compared to the uncompatibilized one and also to the neat materials. Compatibilizing the HDPE/PP system results in a higher elongation at break with a reduced tensile modulus, stress at yield and stress at break[16]. The uncompatibilized HDPE/PP/PS/PMMA/PC shows a much higher modulus, stress at yield and stress at break than any of the other ternary, binary or neat systems. However, this blend demonstrated the lowest elongation at break. Adding EPDM to the multiphase blend results in a slight increase of the elongation at break at the expense of the other properties. However, for the sample prepared at high injection speed, the elongation at break could be increased significantly. Overall the tensile properties for both the compatibilized and non-compatibilized 5-component system are quite good and demonstrate flexibility in tailoring the properties to a given application.

CONCLUSION

A 5 component multiphase system, comprised of HDPE/PP/PS/PMMA/PC, was melt processed to a co-continuous HDPE/PP microstructure with composite droplets of PS/PMMA/PC located exclusively within the PP phase or at the HDPE/PP interface. In terms of morphology, the blends display PS/PMMA/PC composite droplets where a PC core is engulfed by PMMA which in turn is encapsulated by a PS shell.

By using an effective and economical compatibilizer such as EPDM, it is possible to trigger the full segregation of the

[3] G. Wegner and K. Wagemann, "Polymers and the Environment—Current Problems and Future Research," Advanced materials, vol. 6, pp. 629-634, 1994.
[4] Y. Shashoua, "Saving plastics for posterity," *Nature*, vol. 455, pp. 288-289, 2008.
[5] J. Aguado and P. David, *Feedstock recycling of plastic wastes*. Serrano: Royal Society of Chemistry, 1999.
[6] EPA. U.S Environment Protection Agency, "Municipal solid waste generation, recycling, and disposal in the U.S. Facts and Figures for 2008," Washington D.C. 2009.
[7] J. Reignier and B. D. Favis, "Control of the Subinclusion Microstructure in HDPE/PS/PMMA Ternary Blends," *Macromolecules*, vol. 33, pp. 6998-7008, 2000.
[8] N. Virgilio, and al., "Novel Self-Assembling Close-Packed Droplet Array at the Interface in ternary Polymer Blends," *Macromolecules*, vol. 42, pp. 3405-3416, 2009.
[9] N. Virgilio, and al., "In Situ Measure of Interfacial Tensions in Ternary and Quaternary Immiscible Polymer BLends Demonstrating Partial Wetting," *Macromolecules*, vol. 42, pp. 7518-7529, 2009.
[10] J. W. Teh and A. Rudin, "A Review of Polyethylene-Polypropylene Blends and Their Compatibilization," *Advances in polymer technology*, vol. 13, pp. 1-23, 1994.
[11] A. M. C. Souza and N. R. Demarquette, "Influence of coalescence and Interfacial Tension on the Morphology of PP/HDPE compatibilized blends," *Polymer*, vol. 43, pp. 3959-3967, 2002.
[12] L. D'Orazio, and al., "Effect of Addition of Ethylene-Propylene Random Copolymers on the Properties of High Density Polyethylene/Isotactic Polypropylene Blends:

Part 1. Morphology and Impact Behaviour of Moulded Samples," *Polymer engineering science*, vol. 22, pp. 536-544, 1982.

[13] M. S. Lee, and al., "Can random copolymers serve as effective polymeric compatibilizers?," *Journal of polymer science. part B: Polymer physics*, vol. 35, pp. 2835-2842, 1998.

[14] H. Y. Chen, and al., "Olefin Block Copolymers as Polyolefin Blend Compatibilizer," *Antec*, 2008.

[15] Y. Zhenhua and B. D. Favis, "Coarsening of Immiscible Co-Continuous Blends During Quiescent Annealing," *AiCHe Journal*, vol. 51, pp. 271-280, 2005.

[16] P. Sarazin and F. B. D., "Morphology Control in a Co-continuous Poly(L-lactide)/Polystyrene blend: A route Toward Highly Structured and Interconnected porosity in Poly(L-lactide) Materials," *Biomacromolecules*, vol. 4, pp. 1669-1679, 2003.

[17] Y. Lin, and al., "Comparison of Olefin Copolymers as Compatibilizers for Polypropylene and High-Density Polyethylene," *Journal of applied polymer science*, vol. 113, pp. 1945-1952, 2009.

[18] P. A. Bhadane, and al., "Continuity development in polymer blends of very low interfacial tension," *Polymer*, vol. 47, pp. 2760-2771, 2006.

[19] A. R. Kamdar, and al., "Effect of chain blockiness on the phase behavior of ethylene-octene copolymer blends," *Journal of physical science. part B: Polymer physics*, vol. 47, pp. 1554-1572, 2009.

[20] P. Le Corroller and B. D. Favis, *Application of the Core-Shell Morphology for Recycling Applications in Polymer Blends*, Proceeding, World Congress of Chemical Engineering, Aug. 25, 2009;

[21] C. A. Dai, *Reinforcement of Polymer Interfaces with Random Copolymers*, The American Physical Society: Physical Review Letters, (1994), Vol 73, No. 18, pp 2472-2475;

[22] Y. Lyatskaya, Designing Compatibilizers to Reduce Interfacial Tension in Polymer Blends, J. Phys. Chem., (1996), Vol. 100, pp 1449-1458;

The invention claimed is:

1. A polymeric material comprising:
a co-continuous or highly-continuous blend of polyethylene and polypropylene, the blend comprising a polyethylene phase and a polypropylene phase separated by a polyethylene/polypropylene interface, the polyethylene/polypropylene interface being compatibilized by an interfacial agent;
and discrete phases dispersed within said polypropylene phase with no discrete phase located at the polyethylene/polypropylene interface, the discrete phases comprising more than one thermoplastics other than polyethylene and polypropylene, the thermoplastics each having an interfacial tension with the polypropylene higher than the interfacial tension of the polyethylene/polypropylene interface, wherein, in said discrete phases, said more than one thermoplastics serially encapsulate each other, and wherein the thermoplastics are, independently from one another, a polycarbonate polymer, an acrylate polymer, a methacrylate polymer, a polystyrene or another styrenic polymer, a polyvinylchloride or a derivative thereof, or a polyester.

2. The polymeric material of claim 1, wherein the interfacial agent is an ethylene-propylene-diene elastomer or a random ethylene-propylene copolymer.

3. The polymeric material of claim 2, wherein the interfacial agent is an unvulcanized random ethylene-propylene-diene elastomer.

4. The polymeric material of claim 1, wherein the co-continuous or highly-continuous blend comprises the polyethylene and the polypropylene in a 0.5:0.5 weight ratio.

5. The polymeric material of claim 1, wherein the polyethylene in the co-continuous or highly-continuous blend is a high density polyethylene.

6. The polymeric material of claim 1, wherein the thermoplastics are the polycarbonate, the polymethylmethacrylate, and the polystyrene, the polystyrene encapsulating the polymethylmethacrylate and the polymethylmethacrylate encapsulating the polycarbonate.

7. The polymeric material of claim 6 comprising a total of about 20% by weight of the thermoplastics based on the weight of the polymeric material.

8. A process for producing the polymeric material according to claim 1 by recycling of a mixture of thermoplastics comprising polyethylene, polypropylene and more than one other thermoplastics, the process comprising a step of melting and mixing the polyethylene, the polypropylene and the other more than one thermoplastics, thereby producing said polymeric material.

9. The process of claim 8, further comprising a step of mixing the polyethylene, the polypropylene and the other more than one thermoplastics prior to the melting and mixing step.

10. The process of claim 8, wherein the melting and mixing step is carried out in an internal mixer.

11. The process of claim 8, wherein the melting and mixing step is carried out in a twin screw extruder.

12. The process of claim 8, further comprising the step of feeding the polymeric material to an injection system.

13. The process of claim 8, further comprising the step of granulating and drying the polymeric material.

14. The process of claim 8, wherein the melting and mixing step is carried cut in presence of the interfacial agent.

* * * * *